UNITED STATES PATENT OFFICE.

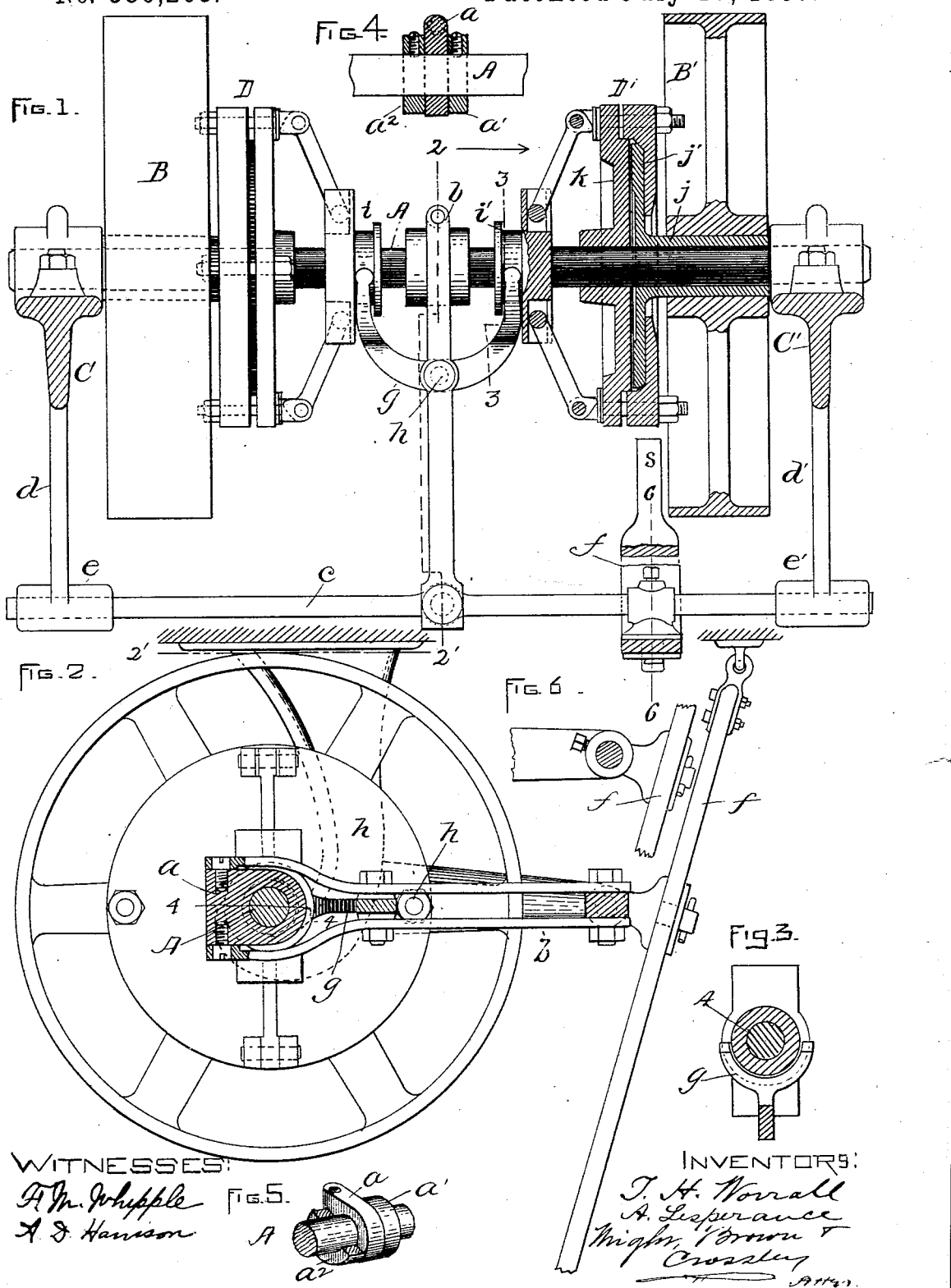

THOMAS H. WORRALL AND ALEXANDER LESPERANCE, OF LACONIA, NEW HAMPSHIRE; SAID LESPERANCE ASSIGNOR TO SAID WORRALL.

POWER-SHIFTING DEVICE FOR CLUTCH MECHANISMS.

SPECIFICATION forming part of Letters Patent No. 586,263, dated July 13, 1897.

Application filed March 18, 1893. Serial No. 466,585. (No model.)

*To all whom it may concern:*

Be it known that we, THOMAS H. WORRALL and ALEXANDER LESPERANCE, of Laconia, in the county of Belknap and State of New Hampshire, have invented certain new and useful Improvements in Power-Shifting Devices for Clutch Mechanisms, &c., of which the following is a specification.

This invention has for its object to provide improved means for reversing the direction of rotation of counter-shafts, which counter-shafts are commonly employed to alter the direction of the belt motion from the main shaft and transmit the same to machines driven from the counter-shaft in a common and well-known manner.

The invention consists in improved means whereby the object above mentioned may be accomplished with the minimum of effort upon the part of the operator and the arrangement of devices whereby the same are rendered more convenient than those heretofore in use.

Reference is to be had to the annexed drawings, and to the letters marked thereon, forming a part of this specification, the same letters designating the same parts or features, as the case may be, wherever they occur.

Of the drawings, Figure 1 represents a plan view of a counter-shaft and the attached devices embodying our improvements, the shaft-hangers being shown in section on the line 2' 2', Fig. 2. Fig. 2 represents a sectional view on line 2 2 of Fig. 1, looking in the direction of the arrow in said figure. Fig. 3 is a section on line 3 3, Fig. 1. Fig. 4 is a sectional detail view on the line 4 4, Fig. 2. Fig. 5 is a perspective detail view of the same. Fig. 6 is a section on line 6 6, Fig. 1.

In the drawings, A represents a shaft, B B the pulleys, and C C the hangers or supports for the same. The shaft is provided with two pulleys in the present case, over which belts (not shown) from the main shaft are adapted to pass, one of which belts is open and the other crossed in the usual manner to give the pulleys opposite rotation. The shaft is provided with a cone-pulley for transmitting motion to the machine to be driven, but which is not here shown on account of lack of space. The reversed rotation of the shaft is accomplished by the alternate engagement of the pulleys with clutches D D', one of which is, with its accompanying pulley, shown in section.

The devices and their arrangement thus far described are in common use and form no part of our invention.

In carrying out our invention we provide a collar $a$, loosely mounted upon the shaft and prevented from lateral movement by collars $a'$ $a^2$, secured to the shaft A upon either side of said collar, as seen most clearly in Fig. 5. The collar $a$ is arranged to project outwardly from the shaft on one side thereof to pivotally support one end of a forked lever $b$, suitably secured to the collar $a$, as seen in Fig. 2. The other end of said lever $b$ is attached to rod $c$, mounted in bearings $e$ $e'$, formed upon arms $d$ $d'$, attached to the shaft-hangers C C. Said rod is adapted to be moved longitudinally in its bearings by a lever $f$, attached thereto, as shown in Fig. 2.

$g$ represents what we term a "shifting-fork," pivoted at $h$ to the shifting-lever $b$ and adapted to engage grooved collars $i$ $i'$, mounted upon the shaft A so as to slide thereon. Said collars are provided with a rectangular or oblong portion in which are formed grooves for the reception of levers, which levers are adapted to operate a friction-clutch mechanism of any suitable form to transmit the motion of the pulley to the shaft. The form of clutch forms no part of our present invention.

By reference to Fig. 1 it will be seen that the fulcrum of shifting-lever $b$ is virtually upon the shaft, which arrangement enables the operator to move the bar $g$, to which the lever is attached, with a slight effort—an advantage which will be understood by those associated with power-shifting devices.

The arrangement of the pulleys with the clutches here shown is as follows: The pulley is secured to a sleeve $j$, loosely mounted upon the shaft and having a disk $j'$ formed upon one end thereof, said disk constituting one member of the clutch, and a disk $k$, mounted upon the shaft so as to rotate therewith, constituting the other member of the clutch, the two disks being brought into contact by means described in the before-mentioned Letters Patent.

In the position shown in Fig. 1 the clutches are inoperative—that is, neither clutch is in engagement with its respective pulley, and said pulleys are free to rotate loosely upon the shaft, the shaft remaining stationary.

When the rod $c$ is moved in either direction by the shifting-lever, the lever $b$ is moved therewith, and the fork $g$ moves one clutch into engagement with its attendant pulley, while the other clutch is disengaged from contact with the opposite pulley, so that only one pulley is in gear with a clutch at the same time, as will be readily understood.

We do not limit ourselves to the employment of the shifting device in connection with friction-clutches, as the same may be employed to shift a belt from a fast pulley to a loose one, and vice versa, without departing from the nature or spirit of our invention.

Having thus explained the nature of the invention and described a way of constructing and using the same, though without attempting to set forth all of the forms in which it may be made or all of the modes of its use, it is declared that what is claimed is—

1. The combination with a shaft carrying pulleys and clutches, of a clutch-shipping mechanism comprising a collar loosely mounted on the shaft, means confining it against longitudinal movement thereon, a lever pivoted to said collar and carrying arms in engagement with the clutches, a sliding rod connected with said lever, and means applied to said rod to shift the same.

2. The combination with a shaft carrying pulleys and clutches, of clutch-operating collars on the shaft, a double fork engaging said collars, a lever-supporting collar loose on the shaft, means confining said last-named collar from longitudinal movement, a lever pivoted to said collar and connected to said fork, and means for operating the lever.

In testimony whereof we have signed our names to this specification, in the presence of two subscribing witnesses, this 3d day of January, A. D. 1893.

THOMAS H. WORRALL.
ALEXANDER LESPERANCE.

Witnesses:
EDGAR F. REEVES,
JOHN W. ASHMAN.